United States Patent [19]

Cole

[11] Patent Number: 6,005,578
[45] Date of Patent: Dec. 21, 1999

[54] METHOD AND APPARATUS FOR VISUAL NAVIGATION OF INFORMATION OBJECTS

[75] Inventor: W. Brooks Cole, Point Reyes Station, Calif.

[73] Assignee: Mindsphere, Inc., Point Reyes Station, Calif.

[21] Appl. No.: 08/937,556

[22] Filed: Sep. 25, 1997

[51] Int. Cl.⁶ .................................................. G06F 3/00
[52] U.S. Cl. .......................................... 345/352; 345/357
[58] Field of Search ..................................... 345/352, 353, 345/356, 357

[56] References Cited

U.S. PATENT DOCUMENTS

| | | | |
|---|---|---|---|
| 5,357,276 | 10/1994 | Banker et al. | 348/7 |
| 5,477,262 | 12/1995 | Banker et al. | 348/7 |
| 5,585,866 | 12/1996 | Miller et al. | 348/731 |
| 5,664,132 | 9/1997 | Smith | 345/352 |
| 5,767,854 | 6/1998 | Anwar | 345/355 |
| 5,786,820 | 7/1998 | Robertson | 345/357 |

FOREIGN PATENT DOCUMENTS

| | | | |
|---|---|---|---|
| 0717346A2 | 6/1996 | European Pat. Off. | G06F 3/033 |
| 0767418A1 | 4/1997 | European Pat. Off. | G06F 3/033 |

OTHER PUBLICATIONS

Gabel, D, "Getting A Grip on Web Site Management . . . ", VAR business, (Jan. 19, 1998) pp. 59.

Web Page entitled "Prevue Networks," United Video Satellite Group, publication date unknown, three–page document, http://www.uvsg.com/UVSG/prevue.htm.

Press release document entitled "Suburban Cable Launches Diva's Onset Service," DIVA Systems Corporation, Menlo Park, California, Dec. 1, 1997, copyright 1998, revised Apr. 30, 1998, four–page document, http://www.divatv.com/wnewlayer1–1.htm.

Untitled web page, et website–Design/Kiosk/Laser Disc, Time Warner Cable, publication date unknown, http://www.et–studios.com/ds_ktwc.html, one–page document.

Web page entitled "Time–Warner finally closes Orlando FSN," Interactive Media International—May 1997, http://www.epsltd.com/eps/database/imi/may97/timew.htm, two–page document.

Web page entitled "Unleashing the processing power," OnSet Video–On–Demand—Breakthrough Technology publication date unknown, copyright 1998, revised Mar. 27, 1998, Diva Systems Corporation, http://www.divatv.com/onsetlayer2–3.htm, two–page document.

Primary Examiner—A. Katbab
Attorney, Agent, or Firm—Graham & James LLP

[57] ABSTRACT

A method and apparatus for organizing and accessing visual objects includes a navigable structure. The navigable structure includes a sequence of one or more levels with each level being a loop of visual objects interconnected by lateral links. The visual objects within a level are interconnected to visual objects within adjacent levels using vertical links. The visual objects within a level may also interconnected to visual objects within non-adjacent levels using hyperspace links. A navigator is provided that allows the user to follow the links included in the navigable structure. At each destination reached by the user, the navigator allows the user to access the visual object.

16 Claims, 6 Drawing Sheets

METHOD AND APPARATUS FOR VISUAL NAVIGATION OF INFORMATION OBJECTS

FIELD OF THE INVENTION

The present invention relates generally to graphical user interfaces for computers and other interactive systems. More specifically, the present invention relates to systems for organizing visual objects into navigable structures and to systems for accessing the visual objects within these structures.

BACKGROUND OF THE INVENTION

The term visual object is a convenient term for describing the visual components of a graphical user interface (GUI). Typically, each display screen may be decomposed into one or more visual objects. For example, a display screen may include a graphics image and a series of icons. Each of these entities is an example of a visual object.

In the past, numerous GUIs have been developed to present visual objects in non-interactive and interactive displays. For example, satellite television networks typically provide an interactive GUI known as a guide. The display provided by the guide is dominated by a single visual object that shows programs that are currently available within the network. The guide allows this visual object to be scrolled up or down to show this information for any of the channels included in the network. The guide may also allows the main visual object to be scrolled side-to-side to show programs that will be playing within the next several days.

In addition to the main visual object, the guide includes a number of secondary visual objects. For example, the guide allows the user to interactively select a program from the main visual object. A secondary visual object is then displayed describing the selected program in more detail. The user can also cause the guide to display secondary visual objects that are associated with system configuration and other details of system operation.

In general, the guide provided within satellite television networks is typical of interactive GUIs that allow users to navigate among a series of visual objects. There are numerous other examples of GUIs that perform similar functions. For example, navigators have been developed that allow users to browse through complex databases such as medical databases. Still other navigation systems have been developed to allow users to access online the help systems provided by many computer systems. The Web browsers that are used to access the Internet and World Wide Web are yet another example.

Satellite television guides, database and web navigators are all effective tools within their respective domains. Still, experience has proven that there is a continued need for improved navigation and display technologies. In particular, where a large number of visual objects are involved, it becomes difficult for the user to appreciated or remember the overall relationship between the visual objects. As a result, the user has difficulty finding objects and remembering where objects are located within the GUI. Thus, a need exists for systems that allow users to navigate between visual objects in an intuitive and easily remembered fashion. This is particularly true in large scale commercial applications where ease of use is often paramount.

SUMMARY OF THE INVENTION

The present invention includes a method and apparatus for organizing visual objects into navigable structures. For a preferred embodiment of the present invention, visual objects are organized into a series of levels. The objects within each level are linked in a circular chain. The series of levels are stacked into a vertical column. Each visual object in a level may be linked to one or more higher visual objects and one or more lower visual object. Higher visual objects are visual objects included in the next higher level. Lower visual objects are visual objects included in the next lower level. Each visual object may also include one or more hyperspace links. A hyperspace link is a link to a visual object that is included in a non-adjacent level.

In many cases, the navigable structure may be organized using one or more themes. For example, in the case of interactive television systems, it would be appropriate to devote each level to a different genre of programming, such as comedy movies, action movies, and so on. As another example, an interactive learning system might devote upper levels to space and sky and lower levels to earth and sea.

The present invention includes a navigator for accessing the visual objects included in the previously described navigable structures. The navigator generates a visual display of the current visual object. When appropriate, the navigator allows the user to interact with the current visual object. Thus, if the current visual object describes a pay-per-view event, the navigator would typically allow the user to interact with the current visual object to purchase a viewing of the event.

The navigator also accepts interactive link-following commands from the user. Thus the user may interactively cause the navigator to cycle forward or backwards through the chain of linked visual objects included in a level. The user may also cause the navigator to move from a visual object to the next higher or lower visual object in an adjacent level. A link-following command may also be used to cause the navigator to follow a hyperspace link to a visual object that is included in a non-adjacent level.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

1. Environment

Figure 1:
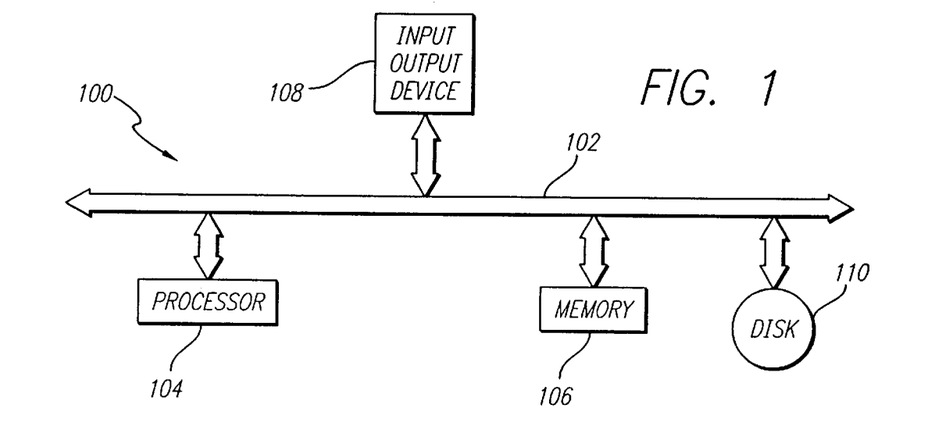
FIG. 1 is a block diagram of a host computer system in accordance with a preferred embodiment of the present invention.

In FIG. 1, a host computer system 100 is shown as a representative environment for the present invention. Structurally, host computer system 100 includes a bus 102 connected to a processor, or processors 104, and a memory 106. An input/output device 108 is connected to processor 100 and memory 106. Input/output device 108 represents a wide range of varying I/O devices such as disk drives, keyboards, modems, network adapters, printers and displays. Host computer system 100 also includes a disk drive 110 of any suitable disk drive type (equivalently, disk drive 110 may be any non-volatile storage system such as "flash" memory).

2. Navigable Structure

Figure 2:
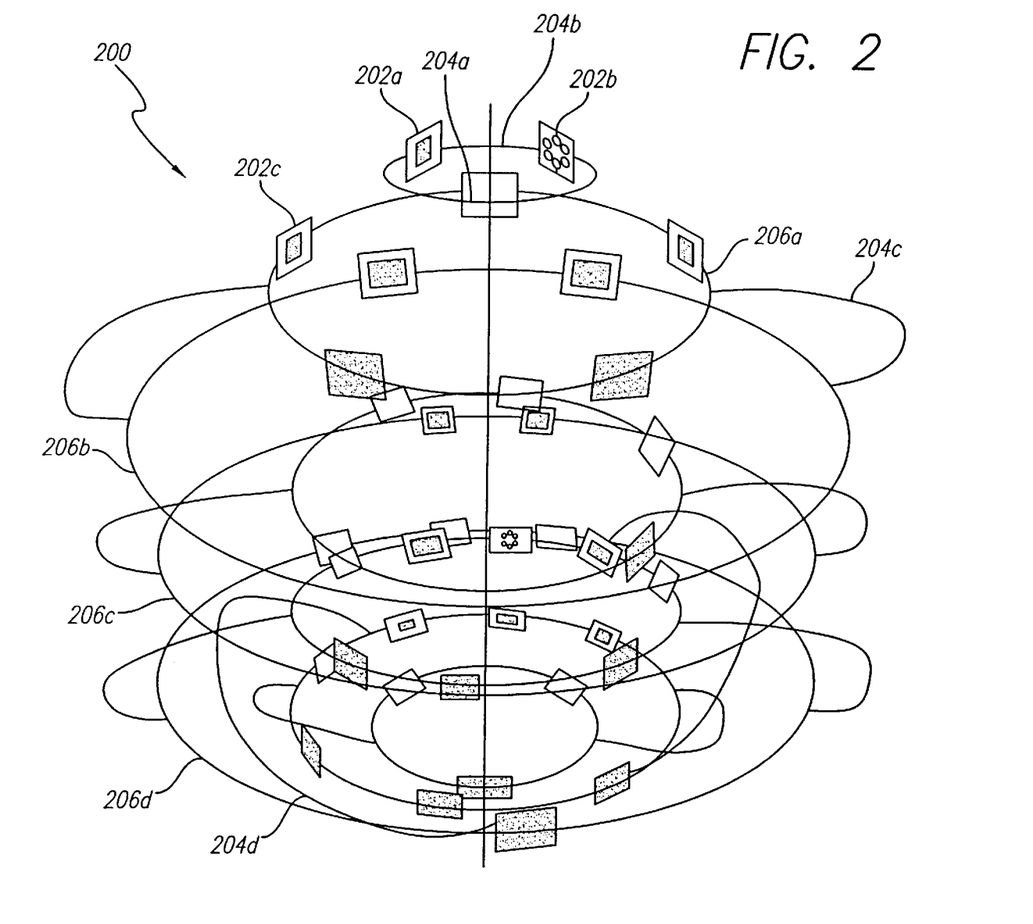
FIG. 2 is a visual depiction of a navigable structure as used in accordance with a preferred embodiment of the present invention.

The present invention includes a method and apparatus for organizing visual objects into navigable structures in memory 108. In FIG. 2, an representative navigable structure is shown and generally designated 200. Navigable structure 200 includes a series of visual objects of which visual objects 202a through 202d are representative. Navigable structure 200 includes a series of links, of which links 204a through 204d are representative. Links 204 form interconnections between visual objects 202.

Within navigable structure 200, visual objects 202 are organized into a series of levels, of which levels 206a through 206c are representative. Each level 206 includes a variable number of visual objects 202. The visual objects 202 included in a level 206 are connected by links 204 to form a circular chain. The circular chain structure means that each visual object 202 included in a level 206 is preceded by a visual object 202 and followed by a visual object 202 Importantly the use of "preceded" and "followed" is intended to describe the position of visual objects 202 within a level 206. Thus, the fact that a particular visual object 202 precedes or follows another visual object 202 does not necessarily imply any particular ranking between the visual objects 202. At the same time, the present invention specifically includes embodiments where the relative position of visual objects 202 expresses a relationship or ranking.

The levels 206 included in navigable structure 200 are arranged into a vertical column. Importantly, the number of visual objects 202 included in each level 206 and the diameter of each level 206 is variable. Thus, a given level 206 may have the same number of visual objects 202 as are found in adjacent levels 206. A given level 206 may also have more or less visual objects 202 that are found in adjacent levels 206.

If should be appreciated that the shape that is displayed for navigable structure 200 is largely independent of the number of visual objects 202 included in the various levels 206. Thus, navigable structure 200 may be displayed as a wide range of shapes including regular shapes such as cylinders, cones, cubes, spheres and torrids. Navigable structure 200 may also be displayed to be fusiform shaped (tapering towards each end), falciform shaped (tapering towards the middle), tapered, or irregularly shaped. In fact, navigable structure 200 may be displayed as any three-dimensional solid or surface.

The links 204 connecting visual objects 202 to preceding visual objects 202 or following visual objects 202 are known as lateral links 204. In addition to these lateral links 204, each visual object 202 in a level 206 may have one or more vertical links 204. A vertical link 204 of a visual object 202 connects the visual object 202 to another visual object 202 included in an adjacent level 206. Each visual object 202 included in navigable structure 200 may also include one or more hyperspace links 204. A hyperspace link 204 is a link to a visual object 202 that is included in a non-adjacent level 206.

For purposes of illustration, the following C++ declaration is included as a possible base class for construction of navigable structure 200:

```
class VisualObjectNode
{
public: VisualObjectNode* Preceding;
public: VisualObjectNode* Following;
public: VisualObjectNode* Higher;
public: VisualObjectNode* Lower;
public: VisualObjectNode* HyperSpace;
};
```

The declaration for the VisualObjectNode class includes Preceding, Following, Higher, Lower and HyperSpace pointers. The first two pointers are used to form lateral links 204. Thus, each class instance within a level will have Preceding and Following pointers that are linked to other class instances within the same level. The Higher and Lower pointers are used to form vertical links 204. Thus, each class instances may have vertical links 204 to class instances on adjacent levels 206. Finally, the HyperSpace is used to form a HyperSpace link 204 allowing a class instance to be linked to a class instance included on a non-adjacent level. Importantly, for the purposes of the present invention, it will generally be preferably to declare the Higher, Lower and HyperSpace pointers as pointers to pointers (not shown). The use of pointer-to-pointer types allows each class instance to have a variable number of vertical and hyperspace links 204.

In a preferred embodiment, the VisualObjectNode class, or a similar class, will be used as a base class. Navigable structures are constructed by deriving classes from the base VisualObjectNode class, with the derived classes including the attributes related to the visual objects 200 that are to be included in the navigable structure 200. It should also be appreciated that the use of C++ is intended to be representative, and that the present invention may be used with a wide range of programming languages and technologies. In particular, the present invention is particularly amenable to programming languages, such as Java® (Java is a registered trademark of Sun Microsystems, Inc.), that allow the navigable structure to be downloaded on demand from a server computer to a client computer. The present invention is also particularly amenable to implementation using the virtual reality modeling language (VRML). The use of VRML allows navigable structure 200 to be downloaded and executed under control of a virtual reality browser or VRML plug-in.

3. Navigator

The present invention also includes a navigator for accessing the visual objects 202 included in navigable structure 200. In most cases, one of the visual objects 202 within navigable structure 200 is designated as an initial visual object 202. When invoked, the navigator uses the initial visual object 202 as a current visual object 202. In some cases, the initial visual object 202 will be selected on a permanent or semi-permanent basis. In other cases, the choice of initial visual object 202 will be user selectable.

Starting from the initial visual object 202, the navigator allows the user to interactively follow the links 204 included in navigable structure 200. As a link is traversed, the destination visual object 202 becomes the current visual object 202. For each visual object 202, the navigator presents a display screen that allows the user to view and, in some cases, interact with the current visual object 202. In general, the type of display screen presented by the navigator will depend largely on the underlying types of visual object 202 included in navigable structure 200.

Figure 3:
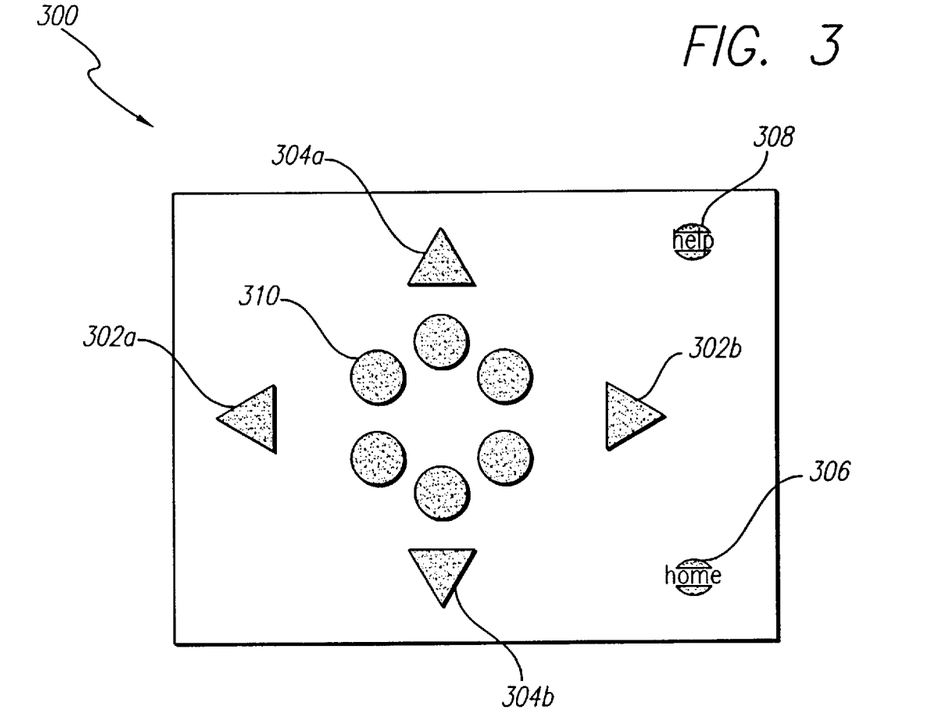
FIG. 3 is a diagram showing a first screen of a user interface as used in an embodiment of the present invention.

For purposes of illustration, a first display screen, as used in a preferred embodiment of the present invention, is shown in FIG. 3 and is generally designated 300. Display screen 300 includes a left lateral icon 302a and a right lateral icon 302b. Activation of lateral icons 302 causes the navigator to follow the lateral links that connect current visual object 202 with the preceding visual object 202 or following visual icon 202, respectively. In other words, activation of lateral icons 302 causes the navigator to traverse through the visual objects 202 included in the level 206 that includes the current visual object 202.

Screen 300 also includes an upper vertical icon 304a and a lower vertical icon 304b. Activation of vertical icons 304 causes the navigator to follow the vertical links that connect current visual object 202 with a visual object 202 included in a level 206 that is adjacent to the level 206 that includes the current visual object 202. In other words, activation of vertical icons 304, causes the navigator to traverse through the levels 206 included in navigable structure 200. It should be appreciated that it is possible for a visual object 202 to have more than a single vertical link 204. In these cases, screen 304 could be extended to include more than a single upper vertical icon 304a and more than a single lower vertical icon 304b.

A home icon 306 and a help icon 308 are also included in screen 300. Activation of home icon 306 causes the navigator to follow a hyperspace link 206 that connects the current visual object 202 to the initial visual object 202. This allows the user to return to the navigator's starting point from any visual object 202. Activation of help icon 308 causes the navigator to display online help. Preferably, this is accomplished by configuring the navigator and the navigable structure 200 so that activation of help icon 308 causes the navigator to follow a hyperspace link 206 that connects the current visual object 202 to an online help visual object 202. In this way, online help may be included as part of the normal structure of navigable structure 200. The hyperspace link 206 activated by help icon 308 may be connected to an online help visual object 202 that is specifically associated with screen 300. In this way, online help may be configured to be context-sensitive. Alternatively, context-sensitivity may be implemented by configuring the navigator to otherwise correlate the context of help icon 308 with a specific portion of a help database.

Screen 300 also includes a radial menu 310. Radial menu 310 includes a series of menu icons. Activation of any of the menu icons within radial menu 310 causes the navigator to follow a link 206 that connects the current visual object 202 to another visual object 202. The link 206 that is followed may be a lateral, vertical or hyperspace link 204. In general, radial menu 310 is intended to allow the navigator user to select from a range or array of choices. For example, if the navigator is being used as an interface to an interactive television system, each radial menu icon might correspond to a particular movie genre. Activation of a particular menu item would cause the navigator to move to a visual object 202 associated with that movie genre. Alternatively, if the navigator is being used as an interface to an interactive magazine, each menu icon might correspond to a particular magazine chapter. Activation of a particular menu item would cause the navigator to move to a visual object 202 associated with that magazine chapter.

Radial menu 310 enables a "spectrum" of divisions within a group to wrap around in a circle so that the lateral relationships of the subsequent level 206 assign meaning to motion; a gradient or sequence. For example, movement to the right might correspond to movement forward in time, such as progressive decades in movies (year of depiction or creation). Another example is a navigable globe that spatializes objects by geographic location and allows rotation by latitude and longitude as well as enlargement or reduction of same so as to enable access to visual objects 202 associated with physical or political locations on earth or other planetary bodies. Still another example would be medical data mapped spatiologically to a metastructure of the human body.

Figure 4:
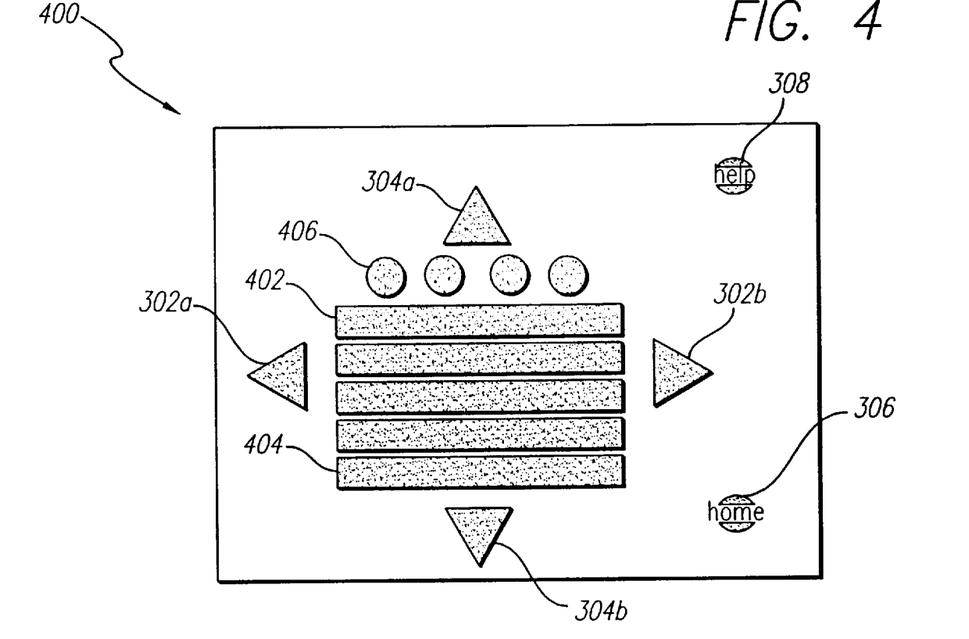
FIG. 4 is a diagram showing a second screen of a user interface as used in an embodiment of the present invention.

A second display screen, as used in a preferred embodiment of the present invention, is shown in FIG. 4 and is generally designated 400. Screen 400 includes many of the features described in regard to screen 300 of FIG. 3. In particular, lateral icons 302, vertical icons 304, home icon 306, and help icon 308 are all included in screen 400. In screen 400, however, radial menu 310 is replaced with linear menu 402. Linear menu 402 includes a series of choice icons, of which choice icon 404 is representative and a series of navigation icons, of which navigation icon 406 is representative.

Functionally, the choice icons 404 included in the linear menu 402 resemble the icons included in radial menu 302. Thus, choice icons 404 are intended to allow the navigator user to select from a range or array of choices. For example, if the navigator is being used as an interface to an interactive television system, each choice icon 404 might correspond to a particular movie genre or a title of a movie within a list of movies. Activation of a particular choice icon 404 would cause the navigator to move to a visual object 202 associated with that movie genre.

The navigation icons 406 included in linear menu 402 allow the user to navigate within linear menu 402. For example, in some cases, the number of choices available to the user of the navigator will exceed the limited number of choice icons 404 included in linear menu 402. In these cases, navigation icons 406 may be included that allow the user to interactively scroll the choice icons 404 included in linear menu 402. Navigation icons 406 included for this purpose might include "first", "next", "previous" and "last" buttons.

Figure 5:
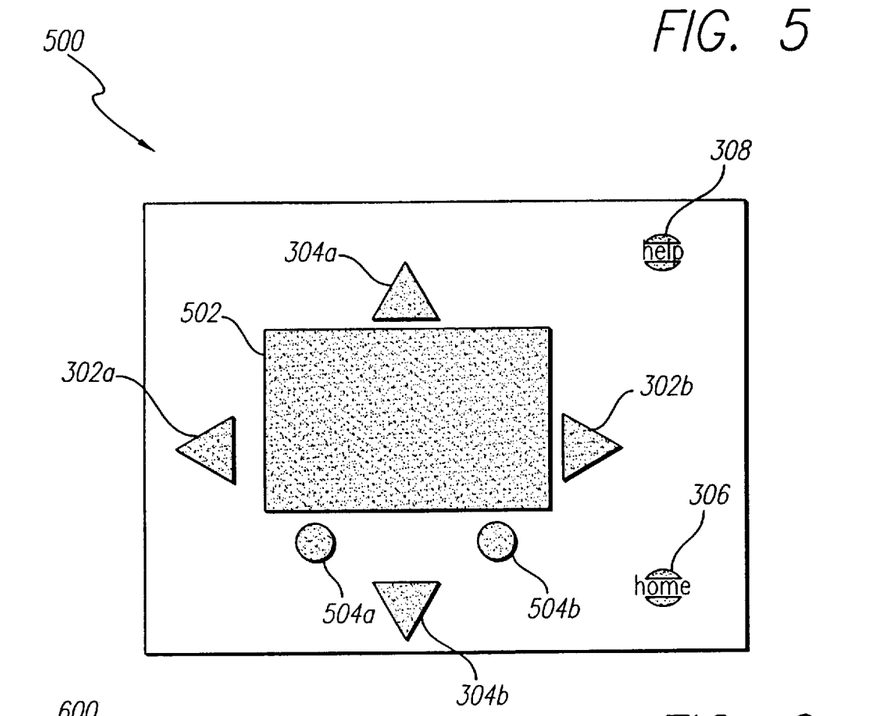
FIG. 5 is a diagram showing a third screen of a user interface as used in an embodiment of the present invention.

A third display screen, as used in a preferred embodiment of the present invention, is shown in FIG. 5 and is generally designated 500. Once again, screen 500 includes the lateral icons 302, vertical icons 304, home icon 306, and help icon 308 described with regard to screen 300 of FIG. 3. In screen 500, however, radial menu 310 of screen 300 is replaced with a dialog screen 502. Dialog screen 502 displays information, such as text, graphics or video. In some cases, dialog screen 502 includes one or more interactive icons, shown in FIG. 5 as interactive icons 504a and 504b. Interactive icons 504 allow the navigator to respond to the information included in dialog screen 502. For example, interactive icons 504 may be provided to allow the user to make a yes/no choice or to enter a password, personal identification number (PIN), credit card number or other information.

Figure 6:
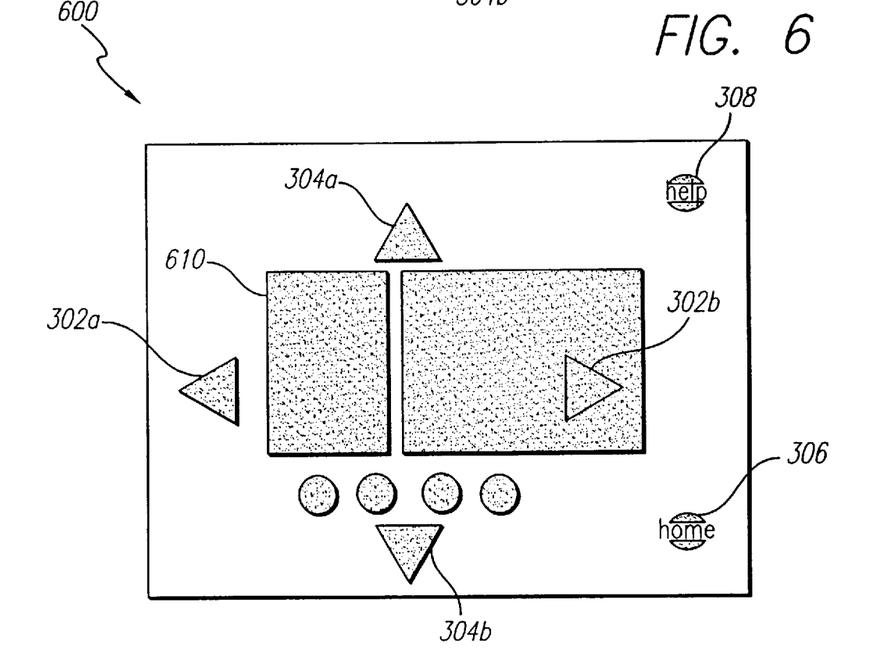
FIG. 6 is a diagram showing a fourth screen of a user interface as used in an embodiment of the present invention.

A fourth display screen, as used in a preferred embodiment of the present invention, is shown in FIG. 6 and is generally designated 600. Screen 600 is generally similar to screen 500. Screen 600, however, extends screen 500 to include a split-screen display. As a result, screen 600 can simultaneously display multiple types of information such as text, graphics and video. For example, screen 600 can be used to present a graphic representation and textual description of a product available for purchase.

Figure 7:
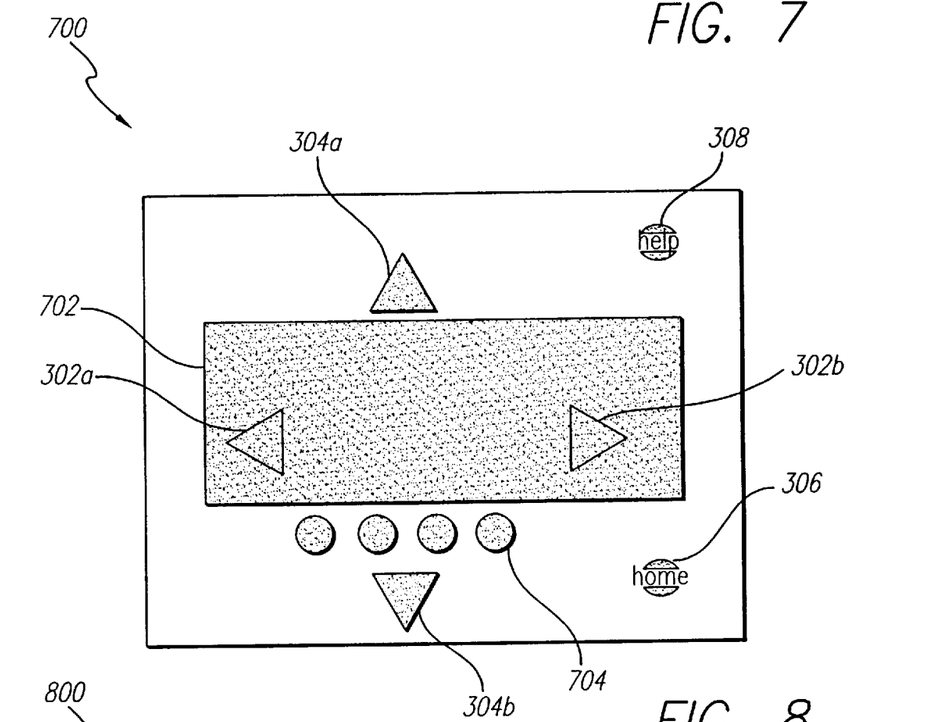
FIG. 7 is a diagram showing a fifth screen of a user interface as used in an embodiment of the present invention.

A fifth display screen, as used in a preferred embodiment of the present invention, is shown in FIG. 7 and is generally designated 700. Once again, screen 700 includes the lateral icons 302, vertical icons 304, home icon 306, and help icon 308 described with regard to screen 300 of FIG. 3. In screen 700, however, radial menu 310 of screen 300 is replaced with a preview screen 702. Preview screen 702 contains a self-running media object such as a video segment or virtual reality demonstration. Screen 700 includes a series of interactive icons of which interactive icon 704 is representative. Interactive icons 704 allow the navigator user to interact with preview screen 702. For example, interactive icons can be included that allow a video segment to be stopped, started, paused, and stepped. Interactive icons 704 can also be included that allow the video segment (or a larger video from which the segment is taken) to be marked or scheduled for later purchase or purchased immediately.

Figure 8:
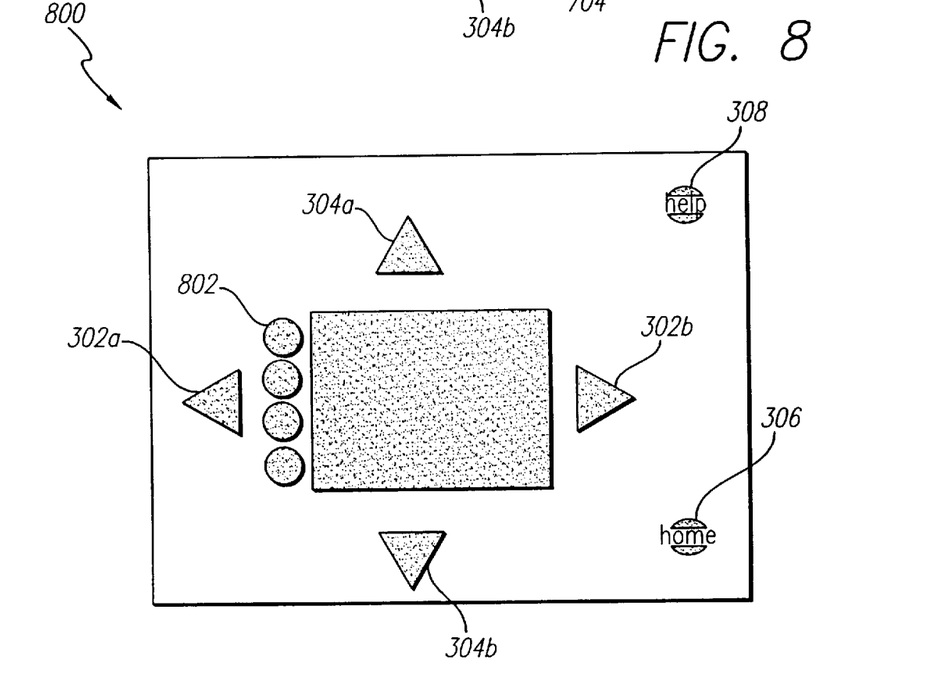
FIG. 8 is a diagram showing a sixth screen of a user interface as used in an embodiment of the present invention.

A sixth display screen, as used in a preferred embodiment of the present invention, is shown in FIG. 8 and is generally designated 800. Once again, screen 800 includes the lateral icons 302, vertical icons 304, home icon 306, and help icon 308 described with regard to screen 300 of FIG. 3. In screen 800, however, radial menu 310 of screen 300 is replaced with a transaction screen 802. Transaction screen 802 presents information that describes items or services that the user of the navigator may purchase. For example, transaction screen 802 may present information that described a pay-per-view movie that the user of the navigator may purchase. Screen 800 also includes a series of interactive icons of which interactive icons 704 is representative. Interactive icons 704 allow the navigator user to select one or more of the offered items or services for purchase.

In general, each of screens 300 through 800 are intended to be exemplary in nature. In particular, each of these screens demonstrates the ability of the navigator to move between visual objects 202 and to interact with visual objects 202. In many cases, it will be desirable to use this ability in combination with screens that differ visually and functionally from screens 300 through 800. Importantly, each of screens 300 through 800 is intended to be used with a wide range of interactive technologies. Thus, interaction with these screens may be accomplished using a keyboard, mouse (or other pointing device), remote control or voice activation. The present invention also anticipates that screens 300 may be included as part of a traditional video display or as part of a three dimension display or virtual reality model. As part of the virtual reality model, a reduced size image of each screen 300 through 800, or thumbnail might be included as part of a three dimensional depiction of navigable structure 200. Users could then visually see the result of following the links 204 included in navigable structure 200.

Figure 9:
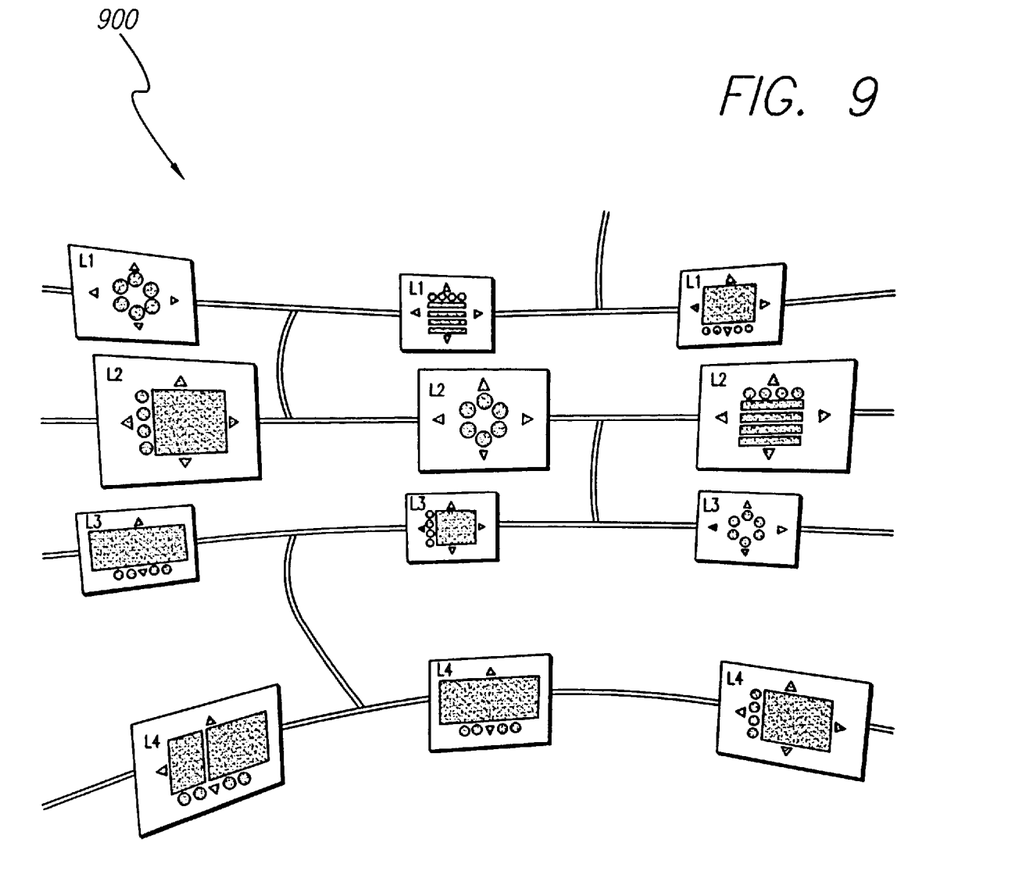
FIG. 9 is a visual depiction of a virtual reality representation of the navigable structure as used in accordance with a preferred embodiment of the present invention.

The use of navigable structure 200 as a virtual reality model may be appreciated by reference to FIG. 2 where various screens are shown as thumbnails included within a three-dimensional structure. This same concept is also shown in FIG. 9, where the a series of screen thumbnails are shown from the perspective of a user immersed within a three-dimensional representation of navigable structure 200.

Figure 10:
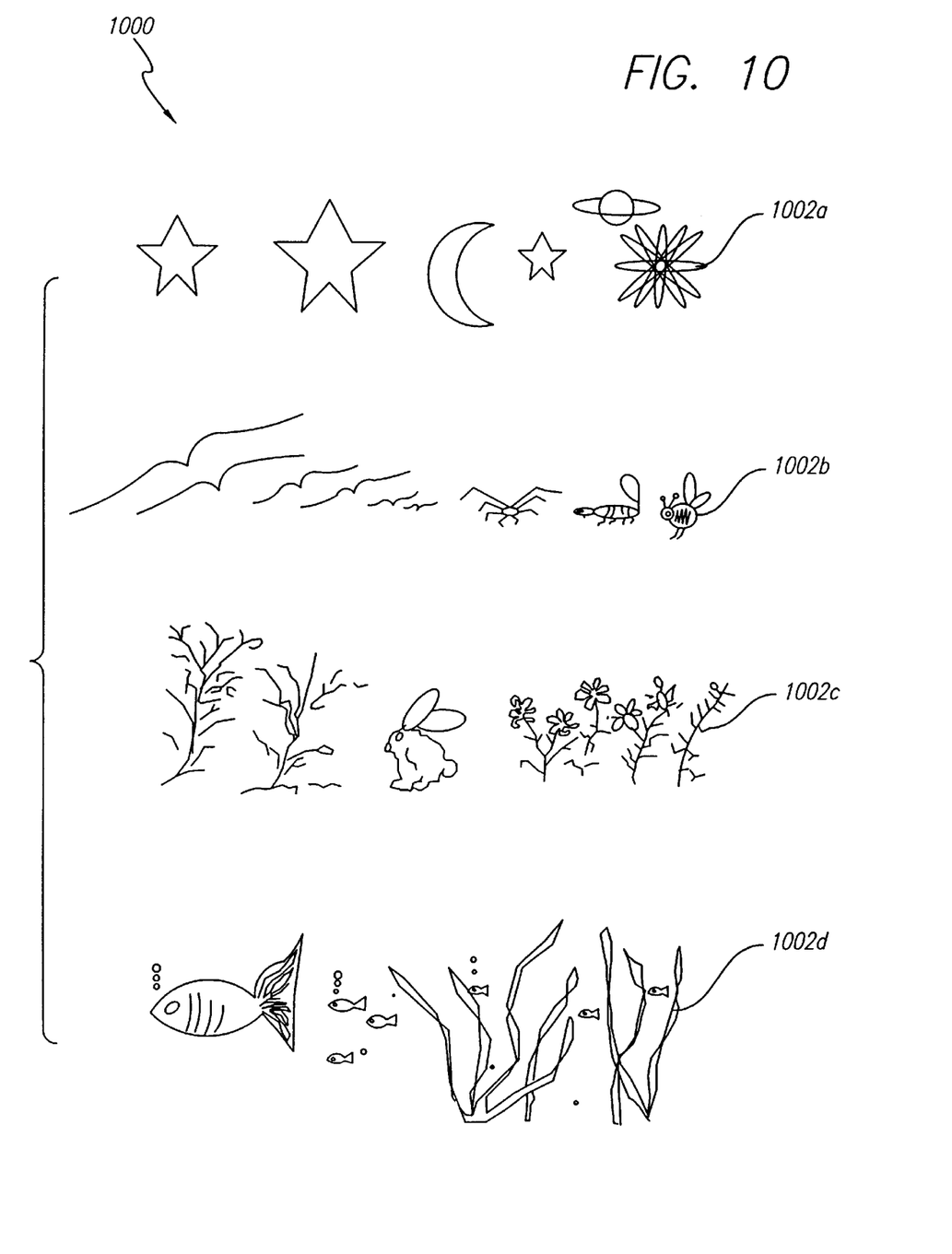
FIG. 10 is shows a representative set of strata as may be used with a preferred embodiment of the present invention.

Screens 300 through 800 and visual objects 202 may also be arranged and presented as part of an overall theme. For example, in FIG. 10, a theme is shown and generally designated 1000. As shown, theme 1000 includes strata 1002a through 1002d. Strata 1002a corresponds to "space" concepts such as stars and planets. Strata 1002b corresponds to "sky" concepts such as birds and insects. Strata 1002c corresponds to "earth" concepts such as animals and trees. Finally, strata 1002d corresponds to "sea" concepts such as fish and kelp. Within navigable structure 200, each level 206 would correspond to one strata 1002. Thus, the visual objects 202 included in a particular level 206 would relate to the concepts included in the corresponding strata 1002. For example, the level 206 corresponding to strata 1002 would included a series of visual objects 202 each relating to something found in the sea. Screens 300 through 800 could also be configured to emphasize the sky-like, air-like, earth-like or sea-like qualities of the particular strata 1002 being accessed by the navigator. It should be appreciated that the particular example shown in FIG. 10 is representative. Thus, many differing themes will generally be useful. For example, for an interactive television system, a set of strata 1002 that correspond to different movie genre would be more appropriate.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A navigable structure for visual objects, the navigable structure stored in a memory and comprising:

a sequence of one or more levels, each level being a loop of visual objects interconnected by lateral links; and one or more vertical links, each vertical link forming a connection between two visual objects included in adjacent levels within the sequence of one or more levels.

2. A navigable structure as recited in claim 1 further comprising one or more hyperspace links, each hyperspace links forming a connection between two visual objects included in non-adjacent levels within the sequence of one or more levels.

3. A navigable structure as recited in claim 1 wherein at least some of the visual objects include interactive menus.

4. A navigable structure as recited in claim 1 wherein at least some of the visual objects are associated with video information.

5. A navigable structure as recited in claim 1 wherein at least some of the visual objects are associated with graphics information.

6. A navigable structure as recited in claim 1 wherein at least some of the visual objects are associated with online transaction information.

7. A navigable structure as recited in claim 1 wherein the levels are organized to correspond to a chosen theme.

8. A method for creating a navigable structure for visual objects, the method comprising the steps of:

creating one or more levels, each level being a loop of visual objects interconnected by lateral links; and creating one or more vertical links, each vertical link forming a connection between two visual objects included in adjacent levels within the sequence of one or more levels.

9. A method as recited in claim 8 further comprising the step of creating one or more hyperspace links, each hyperspace links forming a connection between two visual objects included in non-adjacent levels within the sequence of one or more levels.

10. A method as recited in claim 8 further comprising the step of downloading the navigable structure from a server computer to a client computer.

11. A method for navigation within a navigable structure of visual objects where the navigable structure includes a sequence of one or more levels, each level being a loop of visual objects interconnected by lateral links, and one or more vertical links, each vertical link forming a connection between two visual objects included in adjacent levels within the sequence of one or more levels, the method comprising the following steps, performed by a computer system of:

initializing a current visual object variable to be equal to a predefined initial visual object;

displaying the current visual object;

receiving an interactive command from a navigator user, the interactive command instructing the navigator to traverse a specified link, with the specified link being a lateral link or a vertical link;

following the specified link;

updating the current visual object to reflect the traversal of the specified link; and     displaying the current visual object.

12. A method as recited in claim 11 wherein the navigable structure includes one or more hyperspace links, each hyperspace links forming a connection between two visual objects included in non-adjacent levels within the sequence of one or more levels, and wherein the specified link is a lateral link, a vertical link or a hyperspace link.

13. A method as recited in claim 11 wherein the interactive command is input using a mouse or other pointing device.

14. A method as recited in claim 11 wherein the interactive command is input using a voice recognition device.

15. A computer program product including a computer usable medium having computer readable code embodied therein for navigation within a navigable structure of visual objects where the navigable structure includes a sequence of one or more levels, each level being a loop of visual objects interconnected by lateral links, and one or more vertical links, each vertical link forming a connection between two visual objects included in adjacent levels within the sequence of one or more levels, the computer program product comprising:

a first portion including computer readable program code devices configured to cause a computer to initialize a current visual object variable to be equal to a predefined initial visual object;

a second portion including computer readable program code devices configured to cause a computer to display the current visual object;

a third portion including computer readable program code devices configured to cause a computer to receive an interactive command from a navigator user, the interactive command instructing the navigator to traverse a specified link, with the specified link being a lateral link or a vertical link;

a fourth portion including computer readable program code devices configured to cause a computer to follow the specified link; and     a fifth portion including computer readable program code devices configured to cause a computer to update the current visual object to reflect the traversal of the specified link.

16. A computer program product as recited in claim 15 wherein the navigable structure includes one or more hyperspace links, each hyperspace links forming a connection between two visual objects included in non-adjacent levels within the sequence of one or more levels, and wherein the specified link is a lateral link, a vertical link or a hyperspace link.

\* \* \* \* \*